United States Patent
Muegge

(10) Patent No.: US 11,320,111 B2
(45) Date of Patent: May 3, 2022

(54) ILLUMINATION APPARATUS FOR VEHICLES

(71) Applicant: HELLA GmbH & Co. KGaA, Lippstadt (DE)

(72) Inventor: Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 17/328,652

(22) Filed: May 24, 2021

(65) Prior Publication Data

US 2021/0278058 A1    Sep. 9, 2021

Related U.S. Application Data

(63) Continuation of application No. PCT/EP2019/081454, filed on Nov. 15, 2019.

(30) Foreign Application Priority Data

Nov. 23, 2018    (DE) .................. 10 2018 129 596.0

(51) Int. Cl.
*F21S 41/153*    (2018.01)
*F21S 41/141*    (2018.01)
*F21S 41/33*    (2018.01)
(Continued)

(52) U.S. Cl.
CPC ........... *F21S 43/235* (2018.01); *F21S 41/141* (2018.01); *F21S 41/153* (2018.01); *F21S 41/332* (2018.01);
(Continued)

(58) Field of Classification Search
CPC ...... F21S 43/241; F21S 43/249; F21S 43/315; F21S 41/141; F21S 41/24
See application file for complete search history.

(56) References Cited

U.S. PATENT DOCUMENTS

| 8,042,982 B2 | 10/2011 | Muegge |
| 9,684,110 B2 | 6/2017 | Bungenstock |

(Continued)

FOREIGN PATENT DOCUMENTS

| CN | 206419848 U | 8/2017 |
| DE | 102007057399 A1 | 5/2009 |

(Continued)

OTHER PUBLICATIONS

International Search Report dated Feb. 5, 2020 in corresponding application PCT/EP2019/081454.

*Primary Examiner* — Jong-Suk (James) Lee
*Assistant Examiner* — Eric T Eide
(74) *Attorney, Agent, or Firm* — Muncy, Geissler, Olds & Lowe, P.C.

(57) ABSTRACT

A lighting assembly for vehicles, having a number of light sources and light guide elements for generating different light functions, with a number of scattering optical elements assigned to the light exit side of the light guide elements for scattering the light. A headlamp lens is arranged at a distance in front of the light guide elements. The first light sources and the second light sources are arranged alternately in the direction of extension of the linear light signature. The scattering optical elements and/or the distance of the headlamp lens to the scattering optical elements and/or a distance in between adjacent first light sources running in the direction of extension are designed such that first light beams exiting in each case from the scattering optical elements assigned to the adjacent first light sources and adjacent in the direction of extension.

10 Claims, 3 Drawing Sheets

(51) Int. Cl.
*F21S 43/235* (2018.01)
*F21S 43/31* (2018.01)
*F21S 43/20* (2018.01)
*F21Y 113/10* (2016.01)
*F21W 103/35* (2018.01)
*F21W 103/20* (2018.01)
*F21S 43/14* (2018.01)
*F21W 103/55* (2018.01)
*F21S 43/15* (2018.01)

(52) U.S. Cl.
CPC .............. *F21S 43/26* (2018.01); *F21S 43/315* (2018.01); *F21S 43/14* (2018.01); *F21S 43/15* (2018.01); *F21W 2103/20* (2018.01); *F21W 2103/35* (2018.01); *F21W 2103/55* (2018.01); *F21Y 2113/10* (2016.08)

(56) References Cited

U.S. PATENT DOCUMENTS

| | | | |
|---|---|---|---|
| 9,726,809 B2 | 8/2017 | Sato | |
| 10,641,458 B2 * | 5/2020 | Xiang | B60Q 1/2607 |
| 10,677,410 B2 * | 6/2020 | Wu | F21S 43/243 |
| 11,052,816 B2 | 7/2021 | Muegge | |
| 2005/0243570 A1 * | 11/2005 | Chaves | G02B 3/08 |
| | | | 362/551 |
| 2015/0277020 A1 * | 10/2015 | Chen | G02B 27/1006 |
| | | | 362/613 |
| 2016/0116666 A1 | 4/2016 | Sato | |
| 2017/0241615 A1 * | 8/2017 | Luo | G02B 6/0028 |
| 2017/0276315 A1 | 9/2017 | Kawabata | |
| 2020/0300436 A1 * | 9/2020 | Paroni | F21S 43/241 |
| 2020/0377009 A1 * | 12/2020 | Schmidt | B60R 1/1207 |

FOREIGN PATENT DOCUMENTS

| | | |
|---|---|---|
| DE | 102008048765 A1 | 3/2010 |
| DE | 102011055429 A1 | 5/2013 |
| DE | 102012107437 A1 | 6/2014 |
| DE | 102013107355 A1 | 1/2015 |
| DE | 102014102496 A1 | 8/2015 |
| DE | 102015115969 A1 | 4/2017 |
| DE | 102016118717 A1 | 4/2018 |

* cited by examiner

ILLUMINATION APPARATUS FOR VEHICLES

This nonprovisional application is a continuation of International Application No. PCT/EP2019/081454, which was filed on Nov. 15, 2019 and which claims priority to German Patent Application No. 10 2018 129 596.0, which was filed in Germany on Nov. 23, 2018 and which are both herein incorporated by reference.

BACKGROUND OF THE INVENTION

Field of the Invention

The present invention relates to a lighting assembly for vehicles, having a number of first light sources and second light sources which emit light of different color and/or luminance for generating different light functions, wherein the first light sources for generating a first light function and the second light sources for generating a second light function are arranged in a direction in which a linear light signature extends, with light guide elements respectively assigned to the first light sources and second light sources, which are arranged to run along the direction in which the linear light signature extends, wherein the light guide elements, on a side facing the first light source or the second light source, respectively, in each case have a light entry side, and on a side facing away from the first light source or second light source, in each case have a light exit side, with a number of scattering optical elements associated with the light exit side of the light guide elements for scattering the light, with a headlamp lens arranged at a distance in front of the light guide elements, which lens is shaped in accordance with the linear light signature.

Description of the Background Art

DE 10 2014 102 496 A1, which corresponds to US 2015/0241616, which is incorporated herein by reference, and which describes a lighting assembly for vehicles which has a flat light guide as a light guide element, which light guide has light injection elements with parabolic narrow sides on a light entry side and scattering optical elements on a light exit side. A light source is assigned to each of the light injection elements. The light injection elements cause the injected light to be parallelized. The scattering optical elements cause the coupled-out light to be scattered so that a linear light signature can be perceived at a relatively large aperture angle.

If several linear light signatures are to be provided to generate different light functions, it is known from U.S. Pat. No. 9,726,809 B2 to arrange flat light guide elements with their flat sides facing each other. The flat light guide elements each have a light entry side with beveled narrow sides and a light exit side provided with scattering optical elements. The scattering optical elements are prism-shaped, so that the coupled light is emitted parallel and in the direction of an optical axis of the light sources to an upstream headlamp lens. The headlamp lens is arranged at a distance from the light exit sides of the light guide elements and completely covers them in projection onto the light exit side of the light guide elements. Since the light emitted by the respective light guide elements impinges on the headlamp lens perpendicularly, the illumination areas of the headlamp lens assigned to the light guide elements correspond to the dimension of the light exit area of the respective light guide element whose light strikes the corresponding illumination area. Scattering optical elements arranged on the headlamp lens effect a scattering of the incoming light to generate the desired signal light function. The light guide elements are arranged in pairs, with a first light source emitting a first color being assigned to a first light guide element and a second light source emitting a further color being assigned to a second light guide element of the pair of light guide elements. The light guide elements arranged in pairs lie flat against one another on mutually facing flat sides.

A disadvantage of the known lighting assemblies with flat light guide elements is that, due to the flat dimension of the same, the light sources must maintain a minimum distance in the direction of extension of the light guide elements. The number of light sources per length of the light signature is thus limited.

SUMMARY OF THE INVENTION

It is therefore an object of the present invention to provide a lighting assembly for vehicles with a particularly narrow linear light signature, by means of which different lighting functions can be effectively realized.

To achieve this object, the invention is characterized in that the first light sources and the second light sources are arranged alternatingly in the direction in which the linear light signature extends, and in that the scattering optical elements and/or the distance of the headlamp lens from the scattering optical elements and/or a distance between first light sources or second light sources to one another is designed in such a way that first light beams emitted by light guide elements associated with the first light sources and adjacent in the direction of extension and second light beams emitted by light guide elements associated with the second light sources and adjacent in the direction of extension overlap on the headlamp lens or are arranged directly adjacent to one another.

An advantage of the invention is that different light functions can be emitted from a linear or elongated headlamp lens with high optical efficiency. The basic idea of the invention is to alternately arrange light sources of different color and/or emitting luminance in the direction of extension of a linear light signature or a linear headlamp lens and to design the light guide elements or scattering optical elements assigned to them in such a way that when a first light source of a predetermined color and/or luminance is activated and when a second light source of different color and/or different luminance is activated, in contrast to the first light source, the entire surface of the headlamp lens is illuminated in each case. If only the first light sources are switched on, the headlamp lens is completely illuminated to generate a first light function. If the second light sources are switched on, the same area of the headlamp lens is illuminated to generate the other light function. Since the first light sources and the second light sources are arranged alternately in a common row in the direction of extension of the light signature or in the direction of extension of the row of first and second light sources, the width of the linear light signature or the linear headlamp lens or the entire lighting assembly can be made relatively small. Adjacent first light sources in the row of light sources are thus not arranged directly next to each other, but instead a single second light source is preferably arranged between the adjacent first light sources. The same applies to the adjacent second light sources. In three light sources of different color emission and/or luminance between the adjacent first light sources, a single second light source and a single third light source are preferably arranged. With n light sources of different color emission and/or luminance, thus n−1 light sources of different color emission and/or luminance are arranged between the adjacent first light sources. The same applies for the light sources of different color emission and/or luminance adjacent to the first light sources.

Another advantage results from the improved thermal design of the carrier plate supporting the light sources. Since only every second light source is switched on to generate a specified light function in the direction of extension, the distances between adjacent light sources can be relatively small.

The light guide elements can be rotationally symmetrical to an optical axis of the respectively assigned light sources, so that a parallel light guide can be produced in a simple manner.

The light guide elements can be designed as TIR lenses, on the light exit side of which the scattering optical elements are arranged. The scattering optical elements are designed in such a way that the light beam parallelized by means of the TIR lens is deflected in such a way that the respective light beams of a light function strike illumination areas of the headlamp lens which are directly adjacent to each other or partially overlap. In a simple way, a specified and same area of the headlamp lens can be used for different light functions, wherein the light is emitted homogeneously from the headlamp lens.

According to a further development of the invention, the light guide elements can also be designed as lens optics or reflectors.

According to a further development of the invention, the scattering optical elements each have a dimension in the range of 0.3 mm to 1 mm, so that homogeneous scattering in the direction of the headlamp lens is ensured.

According to a further development of the invention, the scattering optical elements and/or the distance between the light guide elements and the headlamp lens are chosen in such a way that the illumination area of the light beams that are transverse to the direction of extension of the light signature on the headlamp lens is delimited by the longitudinal edges of the latter. The light emitted by the light guide elements is thus "concentrated" on the illuminated surface to a large extent without the presence of scattered light.

According to a further development of the invention, the scattering optical elements can be integrally connected to the respective associated light guide elements. Advantageously, the light sources need only be positioned with respect to the light entry side of the light guide elements.

According to a further development of the invention, scattering optical elements form a front side of a step-shaped supporting body, which can advantageously extend in a three-dimensional space. The step-shaped supporting body is preferably formed in one piece, which simplifies assembly.

According to a further development of the invention, the first light sources and second light sources are arranged alternately on both sides of a carrier plate (circuit board) in the direction of extension. Advantageously, the number of light functions can be further increased in this way. The scattering optical elements associated with the respective light guide elements can be designed in such a way that the light emitted from one side of the carrier plate is incident only on a linear partial surface, preferably a half surface, of the headlamp lens. The same applies to the light sources arranged on the other side of the carrier plate. In this way, several light functions can be emitted from the headlamp lens at the same time.

According to a further development of the invention, the headlamp lens has scattering optics so that the light is emitted at specified aperture angles in accordance with a predetermined signal light function.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
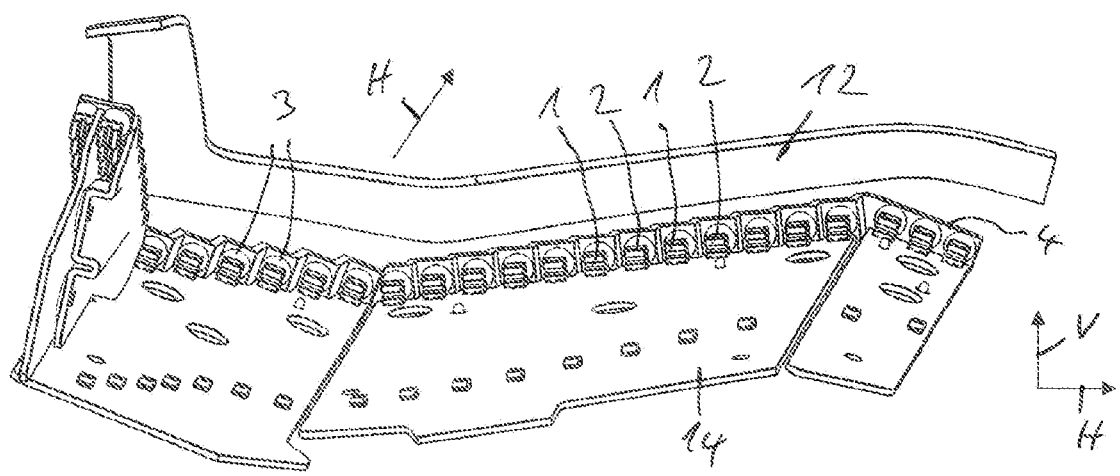
FIG. 1 shows a perspective rear view of a lighting assembly according to a first embodiment with a single row of light sources.

A lighting assembly according to the invention is used for signal light functions in vehicles. For example, a taillight, brake light and indicator light function can be generated in the rear area. For example, a daytime running light and turn signal light function can be generated in the front area of the vehicle.

According to a first embodiment of the invention as shown in FIGS. 1 to 5b, a lighting assembly comprises several first light sources 1 and second light sources 2 arranged in a row to generate a linear light signature. The first light sources 1 differ from the second light sources 2 in terms of their emitted color and/or luminance. The first light sources 1 serve to generate a first light function. The second light sources 2 serve to generate a second light function. The first light sources 1 and second light sources 2 are arranged alternately in an extension direction E of the linear light signature.

In the abovementioned exemplary embodiment, the linear light signature is formed L-shaped, wherein a first part of the first and second light sources 1, 2 extend in the horizontal direction H and a second part of the first and second light sources 1, 2 extend in the vertical direction V.

In accordance with the specified linear light signature (L-shape), light guide elements 3 extend in front of the first light sources 1 and second light sources 2, respectively.

The light guide elements 3 are arranged in the main radiation direction H of the lighting assembly behind a step-shaped supporting body 4, at the rear side 5 of which a light exit side 6 of the respective light guide elements 3 is connected. A light entry side 7 of the respective light guide elements 3 is arranged on a side facing the first light source 1 or second light source 2.

The light guide elements 3 have the same design. They are each rotationally symmetrical with respect to an optical axis 20 of the respective associated first light source 1 or the second light source 2. The light guide elements 3 are each designed as a TIR lens (Total Internal Reflection lens), the peripheral surface of which is designed in such a way that light coupled in from the first light source 1 or the second light source 2 is parallelized. Thus, a first parallelized light beam 8 enters a step element 4' of the stepped supporting body 4 from the light guide element 3 associated with the first light source 1. A parallelized second light beam 9 emitted by the light guide element 3 associated with the second light source 2 enters a step element 4' of the step-shaped supporting body 4, which is arranged adjacent to the step element 4' detected by the first light beam 8. In the present embodiment, the step elements 4' are arranged offset to one another in the main radiation direction H.

According to an alternative embodiment of the invention, the light guide elements 3 can each be designed as lens optics or as reflectors.

According to an alternative embodiment of the invention, the supporting body 4 can also be flat.

On a front side 10 of the step-shaped supporting body 4 or the step elements 4', scattering optical elements 11 are arranged, by means of which the parallelized first light beam 8 or second light beam 9 is deflected in such a way that it strikes in the illumination areas A1 or A2 in each case a headlamp lens 12 arranged at a distance a from the step-shaped supporting body 4. The illumination area A1 on which the first light beam 8 impinges is larger than the area of the step element 4' from which the same first light beam 8 has been emitted. Similarly, the second light beam 9 impinges on the second illumination area A2 of the headlamp lens 12, which area is larger than the area of the corresponding step element 4' from which the same second light beam 9 has been emitted. Instead of being emitted from the respective step elements 4' of the supporting body 3, the first light beam 8 or the second light beam 9 can also be emitted from a light exit surface of the respective light guide elements 3 if the light exit surface of the light guide elements 3 is equipped with the scattering optical elements 11.

Figure 2:
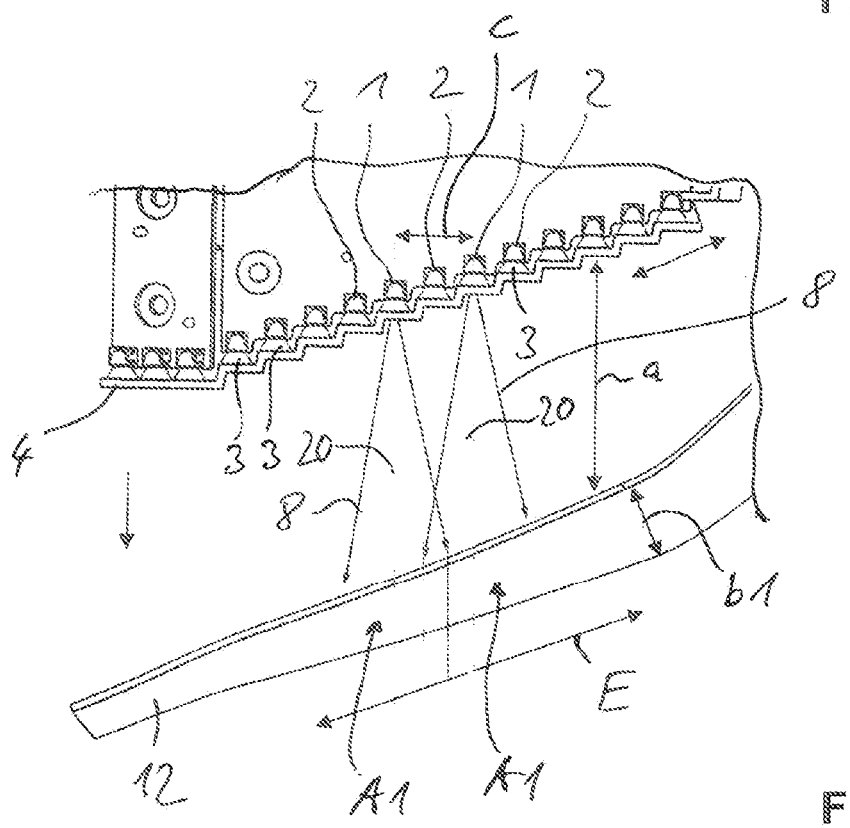
FIG. 2 shows a plan view of the lighting assembly according to FIG. 1 with drawn-in light beams of a first light source with a predetermined color.
Figure 3:
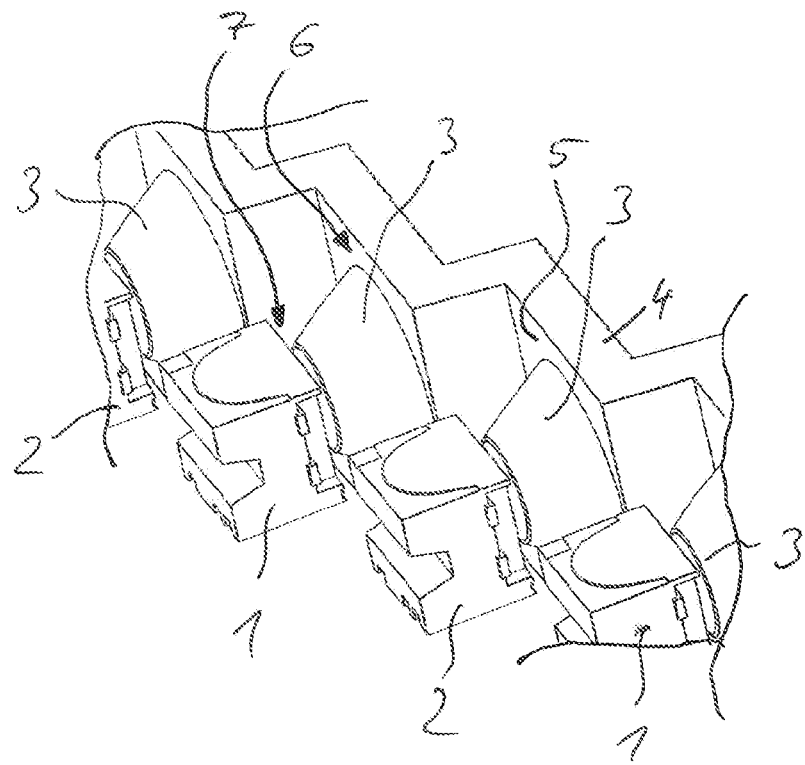
FIG. 3 is an enlarged side view of a portion of light guide elements and a step-shaped supporting body in front.
Figure 4:
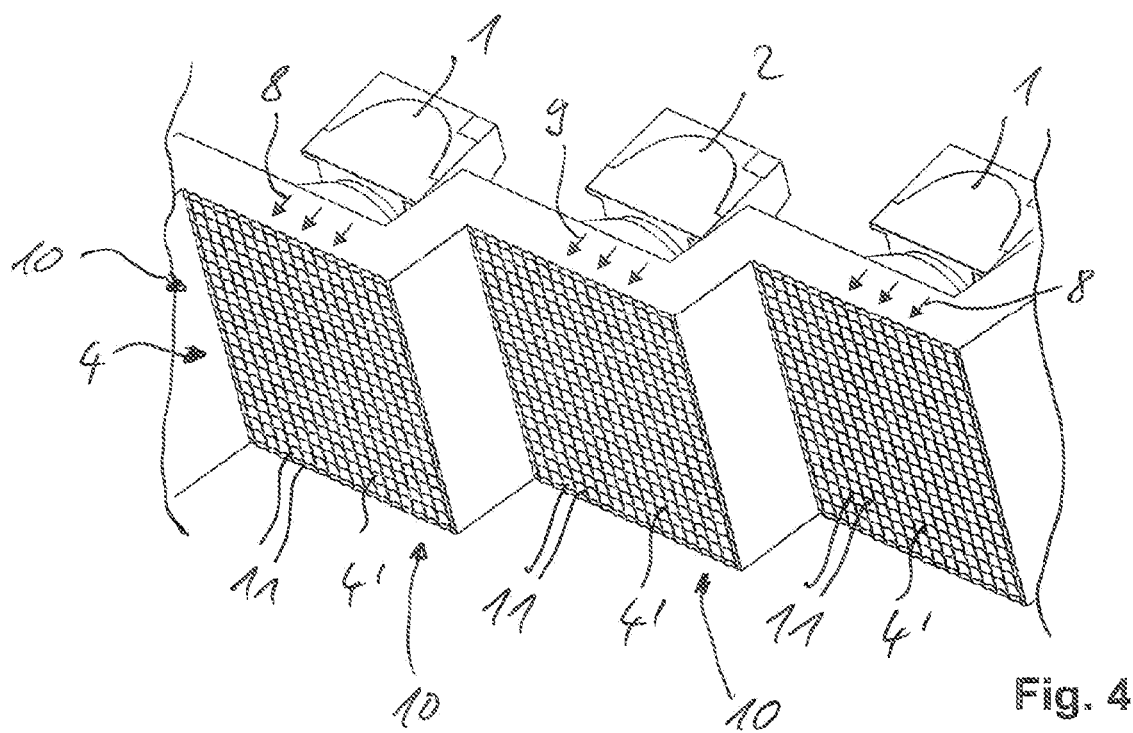
FIG. 4 shows a partial front view of the arrangement according to FIG. 3 with scattering optical elements formed on a front side of the step-shaped supporting body.
Figure 5A:
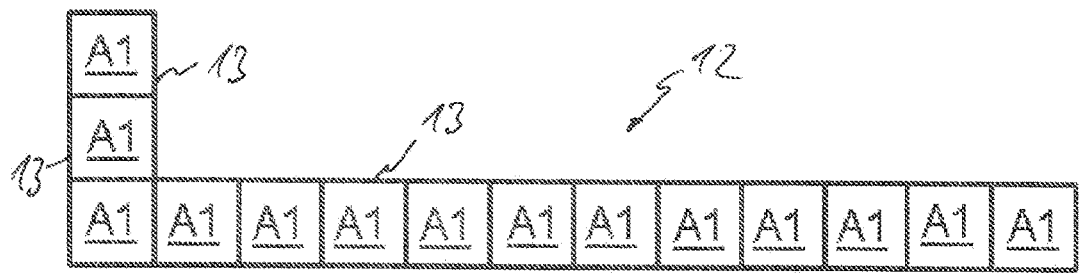
FIG. 5a shows a schematic representation of a headlamp lens of the lighting assembly with illumination areas when first light sources of the lighting assembly are switched on, FIG. 5b shows a schematic representation of the same headlamp lens of the lighting assembly with illumination areas when second light sources of the lighting assembly are switched on, and FIG. 6 shows a schematic rear view of a lighting assembly according to a second embodiment with two rows of light sources and light guide elements running in the direction of extension of the light signal.
Figure 5B:
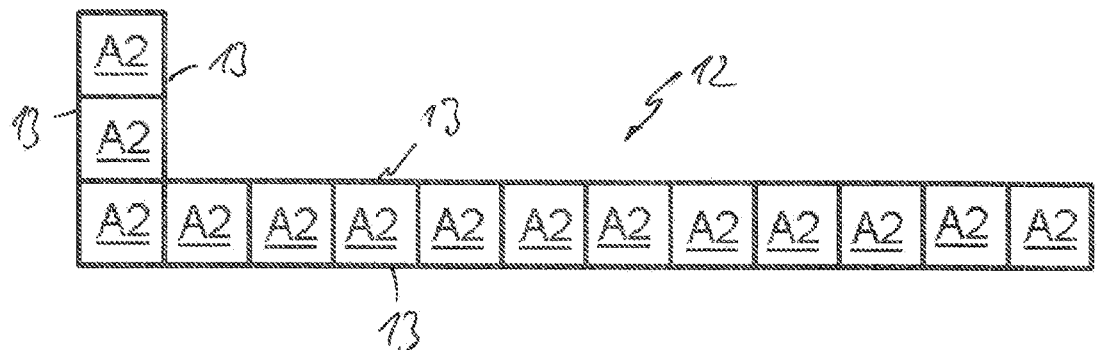

The distance a between the supporting body 4 and the headlamp lens 12 and/or a distance c between adjacent first light sources 1 or between adjacent second light sources 2 and/or the scattering optical elements 11 are designed in such a way that the first light beam 8 of adjacent first light sources 1 and the second light beam 9 of adjacent second light sources 2 impinge on the headlamp lens 12 in such a way that an illumination area A1 of adjacent first light beams 8 and an illumination area A2 of adjacent second light beams 9 directly adjoin one another or—as can be seen in FIG. 2—overlap.

The scattering optical elements 11 thus ensure that no dark sections are formed on the headlamp lens 12 when the first light sources 1 or the second light sources 2 are switched on. Instead, in the switched-on state of the first light sources 1 or the second light sources 2, substantially the entire surface of the headlamp lens 12 is illuminated. This is shown schematically in FIGS. 5*a* and 5*b*. If only the first light sources 1 are switched on, the illumination areas A1 directly adjoin each other in the direction of extension E of the linear light signature or the linear headlamp lens 12. If only the second light sources 2 are switched on, the illumination areas A2 generated by the same directly adjoin one another in the direction of extension E of the light signature, see FIG. 5*b*. The scattering optical elements 11 are designed in such a way that the first light beams 8 guided by the first light source 1 and the respective associated light guide elements 3 impinge on the first illumination areas A1 of the headlamp lens 12, which are delimited by longitudinal edges 13 of the headlamp lens 12. The scattering optical elements 11 are designed in such a way that the second light beams 9 guided by the second light source 2 and the respective associated light guide elements 3 impinge on the second illumination areas A2 of the headlamp lens 12, which are delimited by longitudinal edges 13 of the headlamp lens 12. A width $b_1$ of the headlamp lens 12 is thus relatively small, since it can be used for different lighting functions with a time delay.

In the present embodiment, the scattering optical elements 11 each have a dimension that is in the range of 0.3 mm to 1 mm.

If the first light sources 1 emit white light, the illumination of the headlamp lens 12 serves to generate a daytime running light. If the second light sources 2 emit yellow light, the illumination of the entire headlamp lens 12 can serve to generate a direction indicator light function. In both light functions, the entire surface of the headlamp lens 12 is used for the respective light function.

If the first light sources 1 are designed to emit dark red light, a taillight function can be generated by switching on the first light sources 1. If the second light sources 2 are designed to emit yellow light, a flashing light function can be generated by switching on the second light sources 2 in addition to the first light sources 1.

In the present exemplary embodiment, except for the taillight/brake light function, every second light source 1, 2 of the first light sources 1 and second light sources 2 arranged alternately in a row is put into operation. Thus, two light functions can be generated.

According to an example of the invention, more than two differently designed light sources can also be provided, so that three or more different light functions can be generated. In the case of three different light sources, the first light source 1, then the second light source 2 and then the third light source are arranged in series in the direction of extension E, and then, again, the first light source 1, the second light source 2 and the third light source are arranged in series.

The light guide elements 3 can each lie flat against the rear side 5 of the step-shaped supporting body 4. Alternatively, the light guide elements 3 can also be integrally connected to the step-shaped supporting body 4.

The headlamp lens 12 can have a scattering optic, which is designed, for example, as a cushion-shaped optic or as a strip-shaped optic. The dimensions of the cushion-shaped optics elements or strip-shaped optics elements can be in the range of 0.53 mm to 1 mm. Alternatively, the scattering optic can also be formed as a surface structuring produced by eroding or by etching or by lasering. For example, the surface structuring can also be formed by a diffuser optic with diffractive holographic optical elements. For example, the scattering optic can be designed as a diffractive diffuser optic. This guarantees maximum homogenization of the illumination of the headlamp lens 13.

According to another alternative embodiment of the invention, the headlamp lens 12 may also be formed by volume scattering material.

Figure 6:
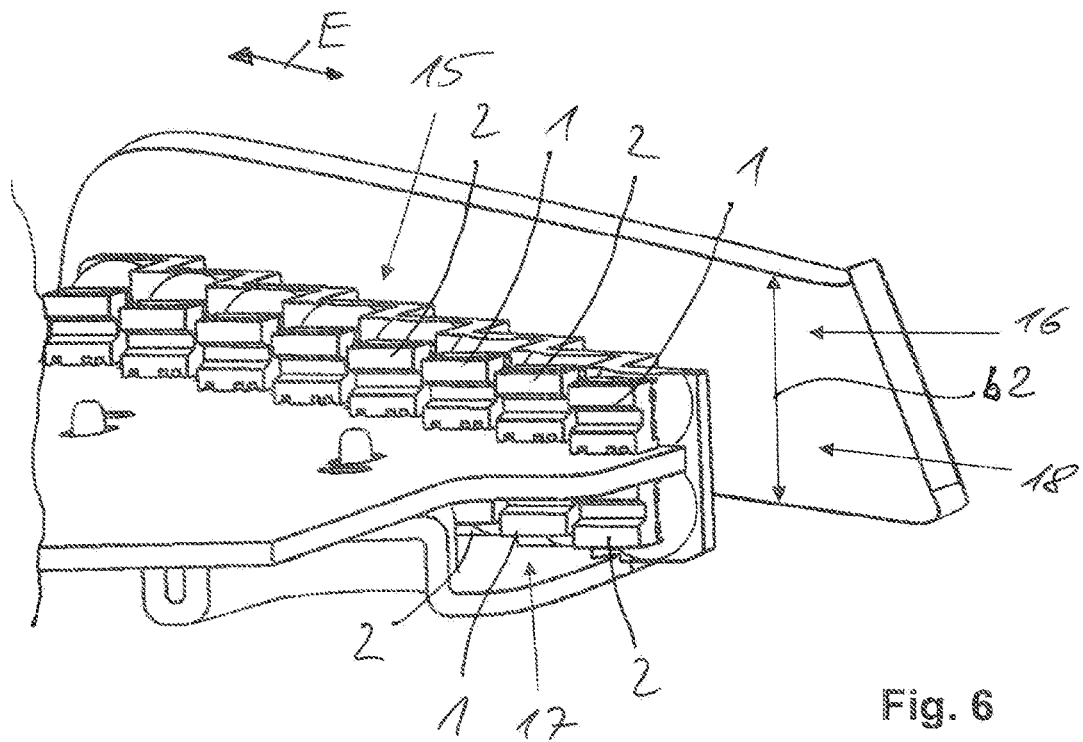

According to a second embodiment of the invention as shown in FIG. 6, the first light sources 1 and second light sources 2 arranged alternately in the direction of extension E can be arranged not only on one side of a carrier plate 14—as described above—but also on another side of the carrier plate 14. Preferably, the first light sources 1 and the second light sources 2 are arranged in pairs transversely to the direction of extension E, so that, for example, if the first light source 1 is arranged at the top, the second light source 2 is arranged at the bottom. This further improves the thermal design. By arranging two rows of first light sources 1 and second light sources 2, a light signature with an increased width b2 can be provided by means of a headlamp lens 12'.

For example, the scattering optical elements 11 of the lighting assembly shown in FIG. 6 with two rows of light sources 1, 2 can be designed in such a way that the light emitted by a first row 15 is incident only on a first longitudinal section 16 of the headlamp lens 12' and that the light emitted by a second row 17 is incident on a second longitudinal section 18 of the headlamp lens 12'. The first longitudinal section 16 and the second longitudinal section 18 are illumination areas which may be arranged directly adjacent to each other or may overlap. The first longitudinal section 16 may correspond to the dimension of the headlamp lens 12 according to the first embodiment, if the first row 15 of light sources 1, 2 are provided according to the first embodiment. The first longitudinal section 16 of the headlamp lens 12' may thus correspond, for example, to a first half surface of the headlamp lens 12', whereas the second longitudinal section 18 corresponds to a second half of the headlamp lens 12'.

According to an alternative embodiment of the invention, the scattering optical elements 11 can also be designed in such a way that the light emitted by the first row 15 of light sources 1, 2 and the light emitted by the second row 17 of light sources each strike the entire surface of the headlamp lens 12'. In this variant, the second row 17 would have light sources that differ in color and/or luminance from the first light sources 1 and/or second light sources 2 of the first row 15 of light sources 1, 2. In this way, more than two light functions could be provided by the same headlamp lens 12' in a space-saving manner.

The light sources 1, 2 are preferably designed as semiconductor-based light sources, preferably as LED light sources. In the present exemplary embodiment, the light sources 1, 2 are designed as side LEDs whose optical axes 20 run parallel to the carrier plate 14. Alternatively, light sources could also be used whose optical axis is perpendicular to the carrier plate. In this case, the carrier element is designed as a flexible printed circuit board.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting assembly for vehicles, the lighting assembly comprising:
   at least two first light sources that each generate a first light beam;
   at least two second light sources that each generate a second light beam, the first light sources and the second light sources emit light of different color and/or luminance in order to generate different light functions and the first light sources being arranged in an extension direction of a linear light signature to generate a first light function and the second light sources being arranged in the direction of extension of the linear light signature to generate a second light function;
   light guide elements associated with the first light sources and the second light sources, the light guide elements being arranged so as to extend along the direction of extension of the linear light signature, the light guide elements having a light entry side on a side facing the first light sources or the second light sources and a light exit side on a side facing away from the first light sources or the second light sources;
   scattering optical elements supporting the light exit side of the light guide elements and to scatter the light; and
   a headlamp lens arranged at a distance in front of the light guide elements, which is shaped according to the linear light signature,
   wherein the first light sources and the second light sources are arranged alternating in the direction of extension of the linear light signature, and
   wherein the scattering optical elements and/or the distance of the headlamp lens to the scattering optical elements, and/or a distance between adjacent first light sources running in the direction of extension and between adjacent second light sources running in the direction of extension are designed such that in the first light function, the first light beams exiting from the scattering optical elements assigned to the adjacent first light sources overlap on the headlamp lens and in the second light function, the second light beams exiting from scattering optical elements assigned to the adjacent second light sources overlap on the headlamp lens, a step-shaped supporting body, wherein each respective one of the light guide elements is arranged on a separate individual step of the step-shaped supporting body.

2. The lighting assembly according to claim 1, wherein the first light sources and the second light sources are controlled such that in the switched-on state of the first light sources or in the switched-on state of the second light sources the entire surface of the headlamp lens is illuminated by the first light beams or by the second light beams, respectively.

3. The lighting assembly according to claim 1, wherein the light guide elements are designed rotationally symmetrical to an optical axis of the respectively associated first light source or second light source.

4. The lighting assembly according to claim 1, wherein the light guide elements are each formed as a TIR lens and the scattering optical elements are arranged on a light exit surface of the TIR lens or on a front side of a supporting body attached to the front side of the TIR lens or wherein the light guide elements are each designed as lens optics or as reflectors.

5. The lighting assembly according to claim 1, wherein the scattering optical elements each have a dimension in the range from 0.53 mm to 1 mm.

6. The lighting assembly according to claim 1, wherein the scattering optical elements are designed such that the first light beam and the second light beam impinge on the headlamp lens between longitudinal edges thereof.

7. The lighting assembly according to claim 1, wherein the scattering optical elements are integrally connected to the respectively associated light guide element.

8. The lighting assembly according to claim 1, wherein the first light sources and the second light sources are arranged alternatingly on a single or on two opposite sides of a carrier plate.

9. The lighting assembly according to claim 1, wherein the headlamp lens has a scattering optic which is formed as cushion-shaped optics or as stripe-shaped optics or as diffuser optics, or as diffractive diffuser optics, or as surface structuring produced by eroding or by etching or by lasering, or in that the headlamp lens is formed of a volume-scattering material.

10. The lighting assembly according to claim 9, wherein the scattering optic comprises a plurality of scattering optical elements having a dimension in the range of 0.53 mm to 1 mm.

* * * * *